US006361750B2

(12) United States Patent
Zhou et al.

(10) Patent No.: US 6,361,750 B2
(45) Date of Patent: Mar. 26, 2002

(54) SYSTEMS FOR PURIFICATION OF BORON TRICHLORIDE (75) Inventors: Derong Zhou, Doylestown, PA (US); Gregory M. Jursich, Clarendon Hill, IL (US); Earle R. Kebbekus, Princeton; John P. Borzio, Robbinsville, both of NJ (US); Jason R. Uner, Chicago, IL (US)

(73) Assignees: Air Liquide America Corporation, Houston, TX (US); American Air Liquide, Inc., Fremont, CA (US)

( * ) Notice: Subject to any disclaimer, the term of this patent is extended or adjusted under 35 U.S.C. 154(b) by 0 days.

(21) Appl. No.: 09/725,965

(22) Filed: Nov. 29, 2000

Related U.S. Application Data (63) Continuation of application No. 09/389,895, filed on Sep. 3, 1999, now Pat. No. 6,238,636.

(51) Int. Cl.[7] .............................. B01J 8/04; C01B 35/06
(52) U.S. Cl. ...................... 422/190; 422/198; 422/211
(58) Field of Search ................................ 422/190, 198, 422/211; 423/240 S, 240 R, 241, 292; 95/132

(56) References Cited

U.S. PATENT DOCUMENTS

| | | | |
|---|---|---|---|
| 2,920,942 A | 1/1960 | Bratt et al. ................. | 423/292 |
| 2,931,710 A | 4/1960 | Leffler ......................... | 423/292 |
| 3,037,337 A | 6/1962 | Gardner ....................... | 95/132 |
| 3,043,665 A | 7/1962 | Gould et al. ................. | 423/292 |
| 3,126,256 A | 3/1964 | Haimsohn et al. ........... | 423/292 |
| 3,207,581 A | 9/1965 | Stern et al. .................. | 423/292 |
| 3,314,753 A | 4/1967 | Richert et al. .............. | 423/240 R |
| 3,376,113 A | 4/1968 | Frevel et al. ............... | 423/240 R |
| 3,411,867 A | 11/1968 | Beach et al. ............... | 423/240 R |
| 3,789,580 A | 2/1974 | Allemang et al. .......... | 423/240 R |
| 4,064,218 A * | 12/1977 | Scholz et al. .............. | 423/240 R |
| 4,125,590 A | 11/1978 | Schmoyer .................... | 423/292 |
| 4,204,926 A | 5/1980 | Meyer et al. .............. | 204/157.44 |
| 4,210,631 A | 7/1980 | DeLue et al. ............... | 423/292 |
| 4,213,948 A * | 7/1980 | Crano .......................... | 423/292 |
| 4,238,465 A | 12/1980 | Chun ........................... | 423/240 R |
| 4,301,126 A * | 11/1981 | Duembgen et al. ....... | 423/240 R |
| 4,405,423 A | 9/1983 | Freund ...................... | 204/158.2 |
| 4,493,818 A * | 1/1985 | Gross ........................ | 423/240 S |
| 5,030,362 A | 7/1991 | Da Silva et al. .......... | 210/774 |
| 5,833,814 A | 11/1998 | Tang et al. ............... | 204/158.2 |
| 2001/0001645 A1 * | 5/2001 | Lee et al. .................. | 422/198 |

FOREIGN PATENT DOCUMENTS

| | | | | |
|---|---|---|---|---|
| EP | 0887309 A1 | | 6/1998 | |
| GB | 1018201 | * | 1/1966 | ................. 423/292 |
| JP | 2000053414 | | 8/1998 | |
| JP | 10265216 A | | 10/1998 | |

OTHER PUBLICATIONS

Calgon Carbon Corporation, *Type PCB Granular Carbon*, 2/86, 23–108b.
Communication dated Dec. 29, 2000 from European Patent Office attaching EPO Search Report.

* cited by examiner

Primary Examiner—Ngoc-Yen Nguyen
(74) Attorney, Agent, or Firm—Linda K. Russell (57) ABSTRACT Processes are disclosed for increasing the condensed phase production of $BCl_3$ comprising less than about 10 ppm phosgene, less than 10 ppm chlorine, and less than 10 ppm HCl. In one embodiment the process comprises injecting an inert gas into a container having condensed $BCl_3$ therein, the condensed $BCl_3$ having therein a minor portion of phosgene impurity. A major portion of the phosgene in the condensed $BCl_3$ is decomposed to carbon monoxide and chlorine by increasing temperature to produce a phosgene deficient stream. The temperature of the phosgene deficient stream is then decreased, and contacted with an adsorbent to remove the chlorine in the stream by adsorption to form a chlorine and phosgene free condensed stream. The chlorine and phosgene free stream is stripped using an inert gas to form a $BCl_3$ product condensed stream, and an inert gas is used to pump the $BCl_3$ product condensed stream to a product receiver.

1 Claim, 2 Drawing Sheets

SYSTEMS FOR PURIFICATION OF BORON TRICHLORIDE

This application is a continuation of application Ser. No. 09/389,895, filed Sep. 3, 1999, now U.S. Pat. No. 6,238,636, which is incorporated by reference herein.

BACKGROUND OF THE INVENTION

1. Field of the Invention

The invention relates to processes and systems for purifying boron trichloride. In particular, the invention relates to processes and systems or apparatus which remove several critical impurities of boron trichloride to produce a highly purified final product required for some of its more stringent applications.

2. Related Art

Boron trichloride (also referred to herein as "$BCl_3$") is a highly reactive compound packaged as a liquid under its own vapor pressure of 1.3 bar (130 kPa) absolute at 21° C. that has numerous diverse applications. It is used predominantly as a source of boron in a variety of manufacturing processes. For example, in the manufacturing of structural materials, boron trichloride is the precursor for chemical vapor deposition ("CVD") of boron filaments used to reinforce high performance composite materials. $BCl_3$ is also used as a CVD precursor in the boron doping of optical fibers, scratch resistant coatings, and semiconductors. Some of the non-CVD applications of $BCl_3$ are reactive ion etching of semiconductor integrated circuits and refining of metal alloys. In metallurgical applications, it is used to remove oxides, carbides, and nitrides from molten metals. In particular, $BCl_3$ is used to refine aluminum and its alloys to improve tensile strength.

Two of the most stringent applications for high purity $BCL_3$ involve semiconductor and optical fiber manufacturing. In these industries the specified impurity levels in BCl3 must be of the order of 1 ppm or less in order to maintain product quality. In fact, the impurities in most commercially available $BCl_3$ are often present at levels over two orders of magnitude beyond acceptable levels for these processes such as, for example, air, $CO_2$, HCl, $Cl_2$, and $COCl_2$ ("phosgene"). Furthermore, in these particular applications, any oxygen or oxygen containing impurities (such as phosgene) in the $BCl_3$ are especially detrimental to the manufacturing process due to the formation of certain oxide compounds. Another class of detrimental impurities in $BCl_3$ for these processes are metal containing impurities.

Geographically, $BCl_3$ is produced almost entirely in the United States. As of 1995, as much as 220 metric tons has been consumed in the United States where about 30% has gone into the production of boron reinforcement filaments, the remaining split primarily among semiconductor etching, Friedel-Crafts catalysis reactions, and intermediate use in pharmaceuticals. In comparison, Japan consumes 70 metric tons which was all imported from the United States. In Japan, $BCl_3$ is used primarily in semiconductor etching and manufacture of crucibles for silicon ingots. Western European countries consumed only about 5 metric tons. (Chemical Economics Handbook, October, 1996.) The source cost of $BCl_3$ varies considerably per pound depending upon purity grade and supplier. There is a strong incentive to purchase $BCl_3$ domestically at a low cost and purify the material to stringent semiconductor purity requirements of technically 1 ppm or less for the light impurities.

After extensively searching the literature and patents, there appears to be no production process technology to have been described or patented regarding how to efficiently remove various impurities from boron trichloride by an integrated purification process technology comprising several different functional chemical processes which are connected sequentially and various impurities associated with boron trichloride are removed sequentially and continuously.

The removal of some impurities in $BCl_3$ has been disclosed previously. In particular, most publications have focused on how to remove phosgene from boron trichloride. This is because phosgene has similar vapor pressure to $BCl_3$ and hence becomes difficult to remove by simple distillation. The previous methods for phosgene removal from $BCl_3$ include electrical discharge, laser pyrolysis, fractional distillation, UV photolysis, and redox chemistry.

Although the individual methods aforementioned had indicated to be able to reduce phosgene content in boron trichloride to a certain degree, these methods do have their drawbacks. For instance, the use of electrical discharge and laser pyrolysis is difficult to implement on a larger industrial scale without extensive equipment and capital costs, and therefore, the economics are not feasible. UV photolysis lacks effectiveness for phosgene removal to very low ppm levels. Further, the similarity of physical properties of phosgene and boron trichloride makes phase separation by distillation and differential surface adsorption difficult to implement in a practical manner. It is also known to use selective chemistry to remove phosgene from $BCl_3$. In these methods phosgene in the $BCl_3$ is allowed to oxidize molten metals such as mercury, copper, and titanium to form the corresponding metal chlorides and carbon monoxide. Although effective in removing phosgene, this approach presents problems with metal contamination, which is particularly difficult due to the volatility of metal chlorides.

In view of all the drawbacks aforementioned, the preferred process of removing phosgene is by thermal decomposition via a catalyst with a specified elevated temperature. For example, the phosgene decomposition on a preferably metal free carbonaceous catalyst was described by two earlier publications. However, in each of these two cases, other troublesome impurities were generated (chlorine in one case, and hydrogen chloride in the other) which require independent purification steps.

Another problem with known $BCl_3$ purification methods is the need to resort to vacuum generating devices or thermal heating of source material and associated handling systems to improve the rate of vapor transport through packed beds of adsorbents or catalytic materials. In known $BCl_3$ purification methods using packed beds such as the case of carbonaceous catalysts, there are significant pressure drops associated with packed beds when high volumetric flow rates are employed and good surface contact required. For many gases, this is not a problem. But, when it comes to $BCl_3$, material transport through such pressure drops becomes significantly hindered due to the $BCl_3$ liquid having only a 1.3 bar vapor pressure at ambient temperature. Thus, maintaining reasonable flow rates through such devices requires some auxiliary means of promoting flow. Conventionally, flow throughput can be advanced by either increasing upstream pressure or decreasing downstream pressure. Increasing upstream pressure can be done using commonly known techniques of gravimetric feeding, mechanical pumping, or thermal heating of source material. However, in the specific case of producing high purity corrosive gases like $BCl_3$, the reactive nature of $BCl_3$ makes the mechanical devices undesirable requiring high maintenance and excessive costs while providing low reliability and the increased likelihood of contamination of the $BCl_3$ by metallic impurities. Gravimetric feeding (in other words, elevating source material relative to the rest of the system) effectively promotes flow as only 2 meter height provides almost 1 bar additional upstream pressure. However, this approach still suffers from the intolerable feature of requiring material transport through the system as entirely liquid phase instead of vapor phase. As a consequence of liquid phase present in the system, excessive contamination of $BCl_3$ by metallic impurities can occur from enhanced liquid phase corrosion mechanisms thereby degrading product purity with detrimental metallic impurities.

One known method of increasing upstream pressure with vapor condensation downstream is to heat the source material and all associated gas handling components to an isothermal temperature. The method is feasible but requires careful temperature control to assure uniform temperature throughout the system. Although feasible, this technique becomes difficult to implement in practice especially for high capacity industrial production.

Resorting to decreasing downstream pressure has its difficulties also. The simplest approach of mechanical pumping suffers from the same problems as in the upstream case. The use of simple low temperature condensation of $BCl_3$ downstream prevents the problems of mechanical pumping but will lead to accumulation of metallic impurities in the final product collected hence degrading purity.

SUMMARY OF THE INVENTION

In the processes of the present invention, phosgene removal is performed by the preferred thermal decomposition route in a manner in which the decomposition impurities are preferably continuously removed. In accordance with the present invention, low temperature condensation is utilized along with secondary inert gas stream such as He, $N_2$, or Ar. In this technique, as disclosed in further detail herein below, the $BCl_3$ material is carried through the defined purification system alone with a secondary inert gas stream. The presence of such a gas stream having higher vapor pressure allows the overall system to be operated at higher pressures than that provided from $BCl_3$ vapor pressure alone. This is preferably performed most simply by bubbling the inert gas through the liquid $BCl_3$ and flowing the mixed gas stream through the system, after which the inert gas is easily separated from the purified $BCl_3$ product collected.

A first aspect of the invention is a process of producing a $BCl_3$ vapor stream containing an inert gas selected from the group consisting of helium, argon, krypton, neon, xenon, or mixtures of one or more of these, from a lower purity $BCl_3$ source, the $BCl_3$/inert gas vapor stream having less than 10 ppm chlorine, less than 10 ppm phosgene, and less than 10 ppm each of light impurities including, but not limited to, nitrogen, oxygen, carbon dioxide, carbon monoxide, and hydrocarbons such as methane, and less than 10 ppm of nonvolatile metal containing species. In one embodiment, using helium as the inert gas, the process comprises injecting helium into a container of a lower purity $BCl_3$ source having phosgene impurity to produce a vapor stream comprising $BCl_3$, helium, and phosgene; decomposing a major portion of the phosgene in the $BCl_3$, helium, phosgene vapor stream by heating the vapor stream to a first temperature, in the presence of a first material, to decompose substantially all the phosgene to carbon monoxide and chlorine, to form a first intermediate vapor stream comprising $BCl_3$, helium, carbon monoxide, and less than 10 ppm phosgene; and adsorbing a major portion of the chlorine in the first intermediate vapor stream at a temperature lower than the first temperature using a second material, thereby producing the $BCl_3$/helium vapor stream having less than less than 10 ppm chlorine, less than 10 ppm phosgene, and less than 10 ppm each of the light impurities. In preferred processes of the invention, the first and second materials are substantially the same.

A preferred process embodiment in accordance with this aspect of the invention is wherein the heating step comprises preheating the vapor stream comprising $BCl_3$, helium, and phosgene prior to the vapor stream comprising $BCl_3$, helium, phosgene contacting the first material, which promotes phosgene decomposition.

A particularly preferred process embodiment in accordance with this aspect of the invention is wherein the preheating comprises heat exchanging the first intermediate vapor stream with the vapor stream comprising $BCl_3$, helium, and phosgene.

Preferably, the phosgene decomposition step occurs in the presence of a catalyst, the catalyst comprising materials selected from the group consisting of carbon-based materials, alumina-based materials, silica-based materials, and mixtures thereof. Preferably, if carbon is used, it is selected from the group consisting of naturally occurring carbon, carbon molecular sieve, or other synthetic carbonaceous material. Alternatively, phosgene decomposition can be implemented in the processes of the invention with other reactive elements such as boron, silicon, and various metals such as titanium or zinc, as described in U.S. Pat. Nos. 3,037,337; 3,043,665; and 3,207,581; however, such elements are not catalytic as they are consumed in the process, and are thus subject to depletion, thus they are not therefore the preferred materials for the phosgene decomposition step.

In accordance with this aspect of the invention, the inert gas functions to increase pressure of the vapor stream comprising $BCl_3$, inert gas, and phosgene to a pressure substantially higher than the vapor pressure of the lower purity $BCl_3$.

Preferably, the phosgene decomposition step occurs at a temperature greater than about 200° C., and the adsorption of chlorine step preferably occurs at a temperature lower than about 50° C., although some chlorine will be adsorbed on the first material at a higher temperature in the phosgene decomposition step.

Furthermore, the chlorine adsorption step preferably comprises using a bed of adsorbent until loaded, removing the bed of adsorbent, heating the removed bed of adsorbent, and reinstalling the bed. More preferably, a second chlorine adsorption bed of same or different adsorbent could be utilized while the first is regenerating, in order to maintain continuity of the process. Alternatively, but less preferable, is the use of one bed of chlorine adsorbent with the appropriate valve configuration to allow isolation from the process and conduit connection to a regeneration system, be it via heated purge or vacuum induced desorption.

A second aspect in accordance with the invention is a process for producing an ultra-pure $BCl_3$ condensed phase from a vapor phase comprising impure $BCl_3$. The process comprises condensing a first vapor stream in a condenser, the first vapor comprising a major portion of $BCl_3$ and a minor portion of HCl, light impurities, and a first inert gas selected from the group consisting of helium, argon, krypton, neon, xenon, and mixtures thereof, to form a first condensed phase comprising $BCl_3$ and a second vapor comprising the first inert gas, $BCl_3$, and light impurities; routing the second vapor stream to a secondary condenser, at a lower temperature, thus forming a gaseous stream containing HCl, light impurities, and the first inert gas and a second condensed phase comprising $BCl_3$; and routing the first condensed phase to a stripper, or using the condenser itself at a more optimal temperature, wherein a second inert gas (the same as or different from the first) is used to strip molecules having vapor pressure greater than $BCl_3$ from the first condensed phase to produce a higher purity first condensed phase having less than 50 ppm hydrogen chloride, preferably less than 1 ppm hydrogen chloride, and a stripped vapor phase.

Preferably, the stripping step includes the step of allowing the first condensed phase to come to room temperature, and then contacting it with helium at a pressure ranging from about 20 psig to about 30 psig [from about 240 kPa to about 440 kPa].

Also, preferred are processes in accordance with this aspect wherein the stripped vapor phase is routed to the secondary condenser to recover residual $BCl_3$, and processes wherein the stream containing only traces of $BCl_3$ from the secondary condenser is routed to a scrubber to remove residual traces of $BCl_3$, along with HCl impurity and introduce a gaseous stream containing the inert gas and light impurities which are discharged to the atmosphere.

Further preferred processes in accordance with this aspect are those wherein the higher purity first condensed phase is transferred to a product container using ultra-high purity inert gas, preferably helium and without any other pumping or vacuum means.

A third aspect of the invention is a process for producing ultra-high purity boron trichloride in condensed phase from a lower purity boron trichloride condensed phase having phosgene impurity, the process comprising injecting an inert gas, preferably helium, into a container of lower purity $BCl_3$ liquid having phosgene impurity to produce a vapor stream comprising $BCl_3$, inert gas, and phosgene; decomposing a major portion of the phosgene in the $BCl_3$, inert gas, phosgene vapor stream by heating to a first temperature to form a first intermediate vapor stream comprising $BCl_3$, inert gas, carbon monoxide, chlorine and less than 10 ppm phosgene; adsorbing a major portion of the chlorine in the first intermediate vapor stream at a temperature lower than the first temperature using a solid adsorbent material, thereby producing the $BCl_3$/inert gas vapor stream having less than 10 ppm phosgene and less than 10 ppm $Cl_2$; routing said $BCl_3$/inert gas vapor stream having less than about 10 ppm phosgene and less than 10 ppm $Cl_2$ to a condenser; condensing a first vapor stream in the condenser, the first vapor comprising a major portion of $BCl_3$ and a minor portion of HCl, inert gas, and light impurities to form a first condensed phase comprising $BCl_3$ and a second vapor comprising the inert gas, residual $BCl_3$, and light impurities; routing the second vapor stream to a secondary condenser, thus forming a gaseous stream containing only traces of (preferably less than about 10 ppm) $BCl_3$ and a second condensed phase comprising $BCl_3$; and routing the first condensed phase to a stripper (or using the secondary condenser itself at a more optimal temperature) wherein inert gas (preferably ultra-pure helium) is used to strip molecules having a vapor pressure greater than $BCl_3$ from the first condensed phase to produce a higher purity first condensed phase having less than 50 ppm HCl, preferably less than 1 ppm HCl, and a stripped vapor phase.

A fourth aspect of the invention is a process for increasing the condensed phase production of $BCl_3$ having less than about 10 ppm phosgene, less than about 10 ppm chlorine, less than about 10 ppm each of light impurities, and less than about 10 ppm HCl, the process comprising the steps of: introducing an inert gas selected from the group consisting of helium, argon, neon, xenon, krypton, and mixtures thereof into a container having condensed $BCl_3$ therein, the condensed $BCl_3$ having therein a minor portion of phosgene impurity; converting a major portion of the phosgene in the condensed $BCl_3$ to carbon monoxide and chlorine by increasing temperature of the condensed $BCl_3$; decreasing the temperature of the stream and removing the chlorine by adsorption and the carbon monoxide by stripping with an inert gas selected from the group consisting of helium, argon, xenon, krypton, neon, and mixtures thereof (preferably helium); and using the inert gas to transfer the $BCl_3$ product to a product container.

In accordance with the present invention, several of the problems encountered in the prior art methods are overcome in the processes and apparatus of the present invention. By use of the inventive purification process technology, all significant impurities of interest in $BCl_3$ for such high purity applications as semiconductor and fiber optic manufacturing are removed in the inventive processes such that a low purity boron trichloride now can be purified into an ultra-pure product with a purity of 99.9995% or higher (on a helium-free basis), or higher required for certain semiconductor and fiber optic manufacturing. The inventive processes and apparatus are preferably designed so as to minimize capital investment costs and to improve reliability. In addition, environmental emission is minimal, thereby reducing exhaust abatement requirements and increasing product yield. The inventive chemical process technology is composed of several different functional chemical processes or operating units as listed in the following:

Injecting an inert gas, preferably helium, into a source container of lower purity $BCl_3$ liquid and extract the vapor out the container;

Using a functional catalyst such as activated carbon to thermally decompose phosgene at elevated temperature;

Using an adsorbent such as activated carbon to remove remaining chlorine at 50° C. or lower;

Condensing $BCl_3$ vapor which has substantially phosgene and chlorine than the source $BCl_3$;

Using an inert gas to strip the $BCl_3$ liquid to remove carbon monoxide, carbon dioxide, hydrogen chloride, nitrogen, oxygen and other lighter gas impurities that may be associated with lower purity $BCl_3$ at the beginning, and/or generated during phosgene and chlorine removing processes upstream.

Transfilling the final $BCl_3$ product from the inventive system into the product storage container using inert gas pressure and no other pumping or vacuum means.

It has been demonstrated that the inventive process technology is fully capable of producing an ultra-pure $BCl_3$ product due to the following important new features.

Activated carbon is a particularly preferred material for the catalytic and adsorption steps, used both at high and low temperatures in such a way as to decompose phosgene and adsorb chlorine byproduct, respectively. One aspect that is surprising and unexpected in the present invention is that the carbon monoxide and chlorine byproducts of phosgene decomposition can be introduced into a lower temperature carbon bed without reformation of phosgene under the process conditions presented. The preferred activated carbon material was found to be fully regenerable to chlorine adsorption without degradation inactivity from $BCl_3$. The preferred activated carbon catalyst which decomposes phosgene has shown the function of a catalyst at the elevated temperature, and therefore, the carbon can be continuously used without addressing the concern of saturation and regeneration.

An ultra-dry inert gas such as helium is employed in the inventive process technology which overcomes the problem of $BCl_3$'s low vapor pressure, and the inert gas can drag $BCl_3$ vapor out of the low purity container and carry the vapor through different purification process units. As a result, this process totally eliminates the requirement of heating the lower purity $BCl_3$ liquid in order to provide enough vapor pressure penetrating each production process unit and of maintaining an isothermal operating condition in order to avoid the vapor condensation where the recondensation is not desired.

Further, the $BCl_3$ purification processes and systems of the present invention do not require any mechanical devices either to transfer the low purity $BCl_3$ into the purification system, or to transfill the final high purity product $BCl_3$ from the inventive system into a storage container. The potential contamination on the final high purity product $BCl_3$ by mechanical transfer means is therefore preferably eliminated, and consequently, the inventive processes and systems also operate more dependably and reliably because no mechanical component is involved in the transfer process.

In addition, the inventive processes and systems are able to run the vapor condensation and the liquid stripping separately, or simultaneously. Each chemical process unit operation of the inventive processes is preferably connected sequentially and the impurities removal operating is preferably continuously. The operating process minimizes potential air contamination and effects thereof because the entire process can be done without breaking down the system except changing the low purity and product containers. Besides, the production processes of the invention are very economical due to the product recovery from the process being 99.99% or higher within the secondary condenser, and consequently, this process technology is environmentally nonintrusive because the product is almost totally recovered with remaining trace $BCl_3$ and HCl impurity easily removed by conventional scrubber technology.

DESCRIPTION OF PREFERRED EMBODIMENTS

Figure 1:
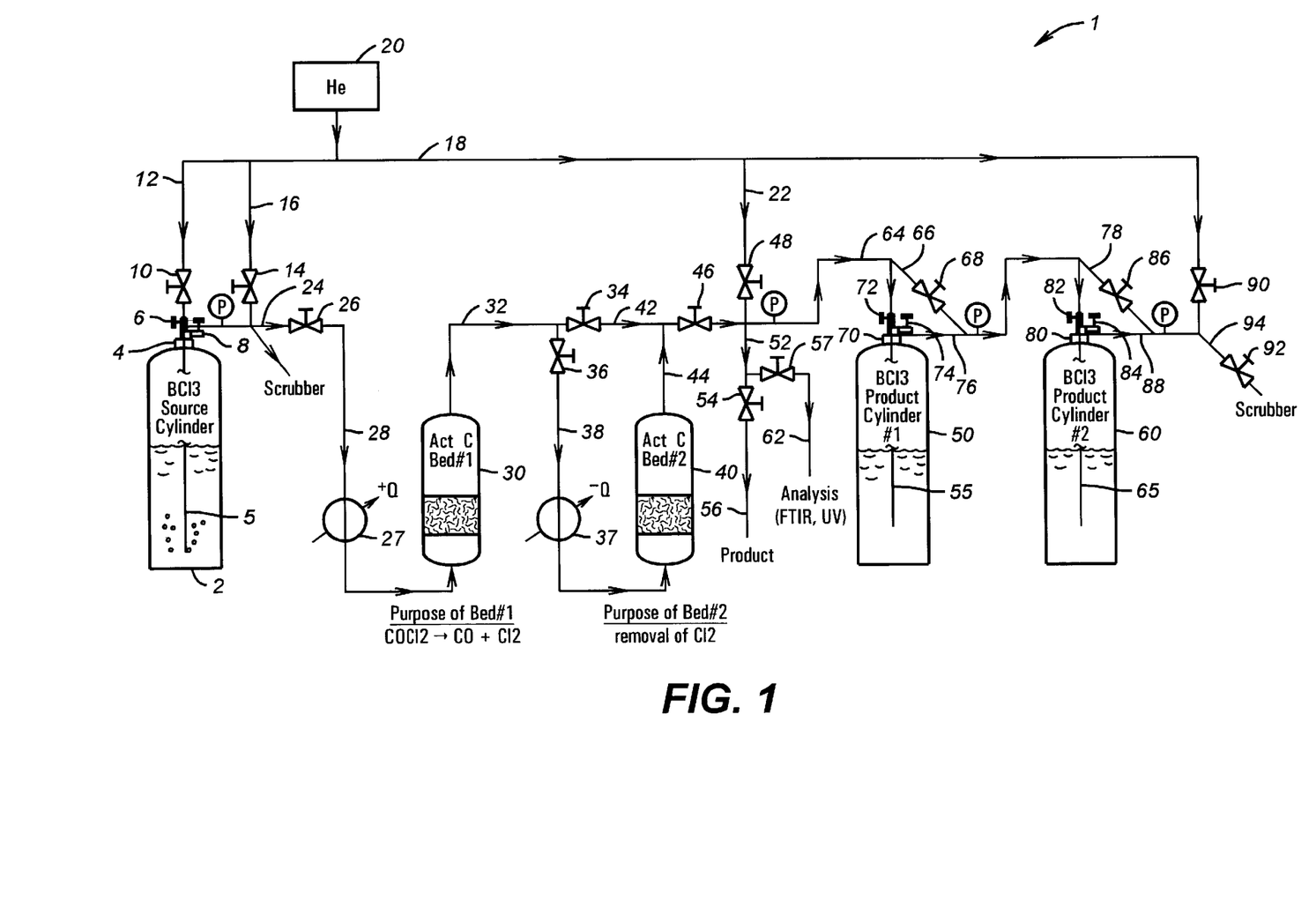
FIG. 1 represents in schematic format an apparatus and process in accordance with the present invention.

Referring to FIG. 1, a preferred system 1 of the invention includes a low purity $BCl_3$ source container 2 and first and second valves 6 and 8 which together form a dual valve T assembly which is sealed into source container 2, as further described in the examples. A tube 5 extends from the bottom of valve 6 into source container 2; an exterior port of valve 6 is connected to a valve 10. Valve 10 in turn is connected to a conduit 12 leading to a source 20 of inert gas, for example helium. A second valve 14 and another conduit 16 also connect to the helium source 20 as well as a third conduit 18 which leads to conduit 22 and other parts of the apparatus. A connection off conduit 24 leads to a scrubber unit, while conduit 24 itself leads to a valve 26 and conduit 28 which itself leads to a heat exchanger 27. Heat exchanger 27 represents a positive heat flow (preferably from heat exchange with flow of hot vapor exiting a reactor 30) into a low purity $BCl_3$/helium mixture emanating from low purity $BCl_3$ source container 2. An electrically heated furnace surrounding the reactor supplies supplemental heat input into reactor 30 as required. The low purity $BCl_3$/helium mixture passes through conduit 28 and heat exchanger 27 and enters phosgene decomposition reactor 30 preferably from the bottom, although this is not necessary. The substantially "phosgene free" boron trichloride vapor having helium therein is directed through a conduit 32, valve 36, conduit 38, and another heat exchanger 37 which removes heat from the substantially phosgene free mixture before flowing into a chlorine adsorption unit 40, where an effective amount of an adsorbent is packed for chlorine removal. As with heat exchanger 27, heat exchanger 37 can be any type of a variety of heat exchanger designs, such as shell and tube, tube and tube, cooling fins attached outside of conduit 38, or even spiral wound heat exchangers. In any case, chlorine adsorption unit 40 is plumbed through a conduit 44 and a valve 46, a conduit 64, and a valve 72, into a condenser 50. A valve 34 and a conduit 42 are provided for bypassing of chlorine adsorption unit 40 if it is not needed as further explained herein. A valve 48 allows for introduction of additional helium pressure flow into the system. A conduit 52, a valve 54, and a conduit 56 may be used to take a product stream from the system of the invention. A valve 58 and another conduit 62 preferably lead to the analytical systems such as FTIR and UV analyzers.

Condenser 50 is fitted with a dual valve T formed from valves 72 and 74, valve 72 having a dip tube 55 extending into condenser 50, preferably as illustrated in FIG. 1. After a substantial portion of the boron trichloride vapor is liquefied in condenser 50, the gas in line 76 may still contain boron trichloride vapor. This vapor is routed to a secondary condenser 60 through valve 82 to dip tube 65. Valves 82 and 84 form another dual valve T assembly. A conduit 78 and a valve 86 form a bypass around secondary condenser 60. Any non-condensed $BCl_3$, in the flow exiting condenser 60, is routed to a conduit 88, a conduit 94, and a valve 92 followed by to a scrubbing unit. A valve 90 allows helium from source 20 and conduit 18 to force vapor through the scrubber.

Figure 2:
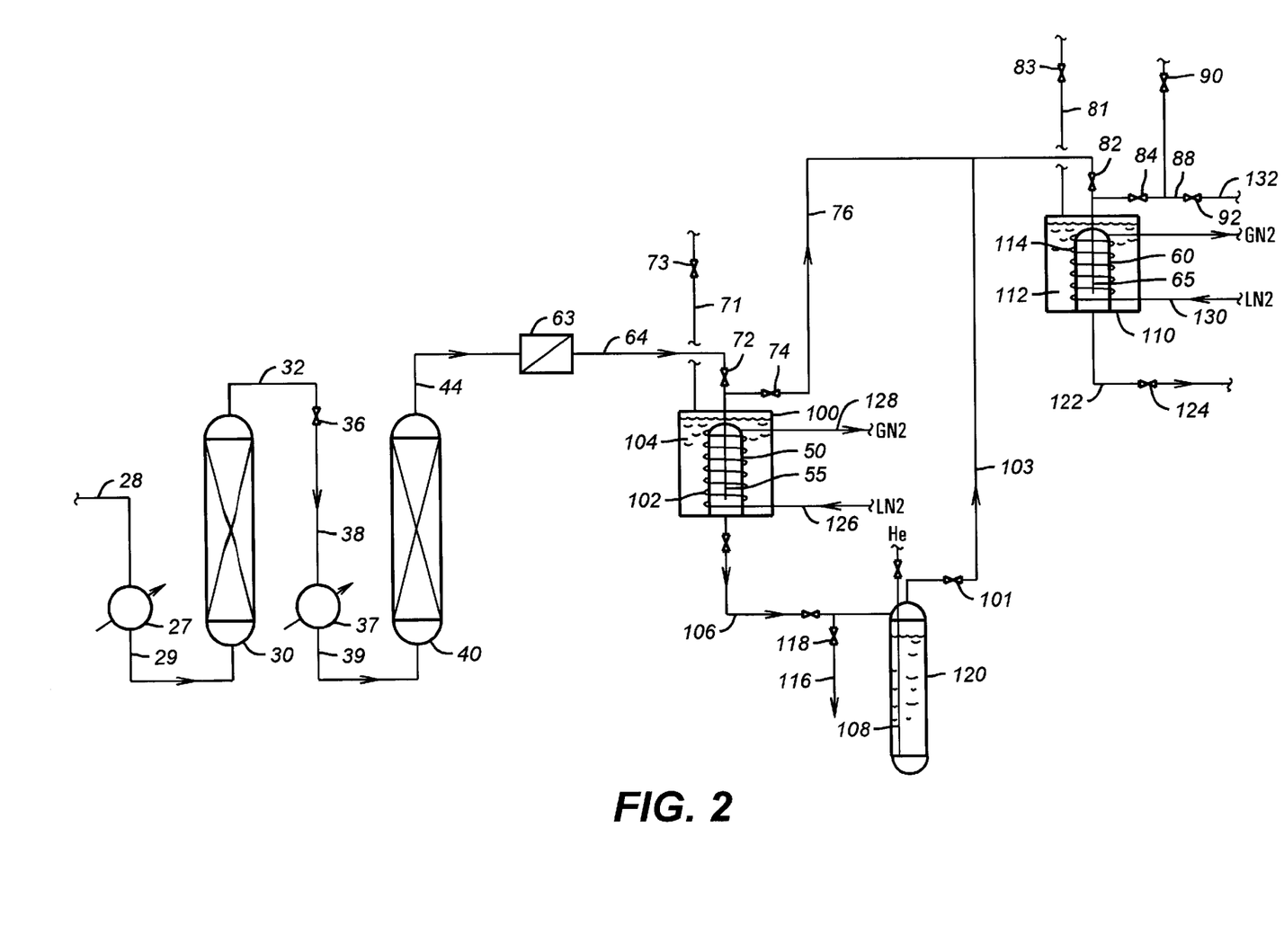
FIG. 2 represents in schematic format the apparatus and process of FIG. 1, emphasizing certain details of the inventive apparatus.

Referring now to FIG. 2, some details of one preferred apparatus are explained in further detail. Where numerals appear as first indicated in FIG. 1, those numerals are equivalent to those in FIG. 2. Thus, FIG. 2 illustrates phosgene decomposition reactor 30, and chlorine adsorption unit 40. Conduit 44 leading out of chlorine adsorption unit is shown in this figure to lead to a filter 63 which removes particles which may have been carried over from the phosgene decomposition reactor 30 and/or the chlorine adsorption unit 40. Filter 63 is connected to a conduit 64, valve 72, and dip tube 55, and into condenser 50. Condenser 50 is vertically positioned in a vacuum jacketed top sealed container 100, and is typically and preferably surrounded by a liquid nitrogen cooling coil 102. Both condenser 50 and cooling coil 102 are immersed in a heat transfer medium 104, such as an alcohol liquid bath. Liquid nitrogen enters the cooling coil through conduit 126 to exchange heat with the liquid bath and container 100. Gaseous nitrogen or a mixture of gaseous nitrogen and liquid nitrogen exits through conduit 128. As will be apparent to the skilled artisan, other low temperature fluids may serve this purpose as well, such as liquid argon.

Referring again to FIG. 2, illustrated is a conduit 106, exiting from container 100, leading to a stripper column 120.

Stripper column 120 has a source of helium, typically entering at the lower end of column 120 through a conduit 108. This helium flows up the stripper column, and exits with some trace level $BCl_3$ vapor and other impurities through valve 101 and conduit 103, and leads preferably to another vacuum jacketed top sealed container 110 having therein secondary condenser 60. Secondary condenser 60 is surrounded with a liquid nitrogen cooling coil where liquid nitrogen enters through a conduit 130 and either a gaseous nitrogen, or a combination of liquid and gaseous nitrogen exits. Vacuum jacketed and top sealed container 110 contains a heat transfer bath 112 and both coil 114 and secondary condenser 60 are immersed in the heat transfer fluid 112 contained in container 110.

Both the vacuum jacketed and top sealed container 100 and 110 have vent systems. As depicted in FIG. 2, container 100 has a vent conduit and valve 71 and 73 leading to a scrubber, while container 10 has a vent conduit 81 and valve 83 also leading to a scrubbing unit. Stripped product is removed from stripper 120 via conduit 116 and valve 118. The operation of the various inventive apparatus depicted in FIGS. 1 and 2 are now explained in further operational detail using helium as the inert gas.

Helium with a pressure ranging from about 150 to about 250 psig (about 1130 to about 1820 kPa) from source 20 has been previously directed into a molecular sieve bed (not illustrated) for trace moisture removal. Hence source 20 is a supply of ultra-dry helium (simply referred to as helium hereinafter). The ultra-dry helium stream is then preferably branched to one or more different processing operations with an individually specified pressure. Helium from source 20 has also passed through a gas filter (not illustrated) where particles with a size of 0.003 $\mu$m or larger were removed.

One helium flow, with a pressure ranging from about 20 to about 30 psig (about 240 to about 310 kPa), is directed via dip tube 5 into the low purity boron trichloride liquid container 2 and bubbles through the low purity $BCl_3$ liquid where a mixture of the helium and $BCl_3$ vapor is generated. This mixture is carried into the phosgene decomposition reactor 30 in which an effective amount of catalyst, preferably activated carbon, is packed. The phosgene, as one of the impurities associated with low purity boron trichloride, is decomposed into CO and $Cl_2$ with the help of the catalyst at an operating temperature ranging from about 480 to about 700° F. (250 to 370° C.). Reactor 30 is heated by an electric furnace surrounding the reactor. Within reactor 30, an elevated phosgene concentration of 500 ppm or higher in the low purity $BCl_3$ can be reduced to less than 0.1 ppm. In a laboratory setting, the superficial residence time was about 1 second in reactor 30. Due to the fact that the activated carbon functions as a catalyst, saturation of the activated carbon is not a concern in this technology.

Then "phosgene free" boron trichloride vapor mixed with the helium is decreased in temperature to between 50 to 80° F. (10 to 26° C.) by heat exchange with air. The cooled gas is then directed into adsorption unit 40 where an effective amount of activated carbon is packed mainly for the purpose of chlorine removal. Since CO and $Cl_2$ can reform into phosgene at slightly elevated temperature, it is imperative to reduce the temperature to less than about 80° F. (26° C.) prior to directing the phosgene free $BCl_3$ into the second low temperature adsorbent unit 40 and maintain this low temperature in order to prevent reformation of phosgene. Further since both $Cl_2$ adsorption and reformation of phosgene are exothermic reactions, adsorption unit 40 is preferably configured to prevent substantial temperature build-up in adsorption unit 40. By experiments, the preferred catalyst, activated carbon, used in adsorption unit 40 has chlorine adsorption capacity of 20%. Adsorption capacity less than 20% is considered within the invention, but it should be at least 10% to be practical. In other words, one pound (454 grams) of the preferred activated carbon can preferably retain 0.2pound (91 grams) of chlorine. By this unit operation, the generated chlorine can be reduced to 1 ppm or less in the $BCl_3$ stream. The preferred activated carbon can be regenerated by heating the bed for a time sufficient to drive off the adsorbed chlorine.

Either the phosgene decomposition reactor 30 or chlorine adsorption unit 40 may contribute particles into the boron trichloride stream due to the fact that both are packed preferably with a granular material. Therefore, the flow stream exiting chlorine adsorber unit 40 preferably passes through a filter 63 in which particles having a size of 0.003 $\mu$m or larger will be retained.

After the particles are removed, the stream is then passed into a condenser 50 through a dip tube 55. The temperature of condenser 50 is controlled between –80 and –100° F. (–62 and –73° C.) thus causing the majority of the boron trichloride vapor to be liquefied and stored. Condenser 50 is preferably vertically positioned in a vacuum jacketed top sealed container 100 (more fully described in reference to FIG. 2) in which condenser 50 is surrounded by a liquid nitrogen cooling coil 102. Both condenser 50 and cooling coil 102 are immersed in a heat transfer medium 104 such as an alcohol liquid bath.

The alcohol liquid bath 104 is refrigerated and maintained at a designated condensation operating temperature by liquid nitrogen passing through coil 102. After the boron trichloride vapor is liquified in condenser 50, the helium flow exiting from condenser 50 in line 76 may still contain between 0.5 and 1.5% of boron trichloride vapor, the actual amount depending upon operating parameters typically used by skilled artisans. This vapor is routed to a secondary condenser 60 through valve 82 and dip tube 65 for further boron trichloride vapor collection where the operating temperature is preferably controlled at between –120 and –125° F. (–84 and –87° C.). The configuration and arrangement of secondary condenser 60 are similar to condenser 50 except for the lower operating temperature. Secondary condenser 60 is cooled by cooling coil 114. Both coil 114 and secondary condenser 60 are immersed in a heat transfer bath 112 contained in vacuum jacketed, top sealed container 110. The $BCl_3$ concentration in the effluent from secondary condenser 60 through valve 84 and conduit 88 is less than 100 ppm. This effluent is directed to a scrubber through valve 92 and conduit 94. Once the $BCl_3$ liquid level inside condenser 50 reaches the designated holding capacity, the cold liquid $BCl_3$ then is preferably totally transferred via line 106 into the stripper column 120 by the helium for further impurities removal.

After the $BCl_3$ liquid in stripper 120 has warmed up to room temperature, the $BCl_3$ liquid is stripped by the helium entering at conduit 108 at an operating pressure ranging from about 20 to about 30 psig (about 240 to about 310 kPa) to strip the gas impurities out of the $BCl_3$ liquid. The stripped-out flow stream in line 103 is comprised of carbon monoxide, carbon dioxide, nitrogen, oxygen, hydrogen chloride, and other light gas impurities along with $BCl_3$ entrained in helium. The stripped-out flow containing $BCl_3$ vapor is directed into secondary condenser 60 for further $BCl_3$ vapor recovery by opening valve 101. The effluent stream from secondary condenser 60 in conduit 94 and valve 92 is neutralized by a wet chemical scrubber (not shown) to remove trace $BCl_3$ vapor and other acid components such as HCl before final discharge to atmosphere.

The stripping operation in stripper 120 is continued for a length of time depending upon the starting impurity concentration and the final product specification requirements. This process can reduce the concentrations of carbon monoxide, carbon dioxide, nitrogen, and oxygen to less than 0.1 ppm in gas phase. One more important accomplishment is that this process is able to reduce hydrogen chloride to 1 ppm or lower in gas phase.

Once the concentrations of the impurities meet the final product specifications, the product is pushed out from the purification system via conduits 116 and 122 and valves 118 and 124 into a product container (not shown) by helium. Stripper 120 is then ready for another stripping operation while the vapor condensation is continued in condenser 50.

EXAMPLES

Example 1

In this example, the $BCl_3$ source container 2 was an approximately 50 liter carbon steel storage vessel that was equipped with a "dual valve tee" at one end. "Dual valve tee" refers to two valves connected to a tee union whereby the base of one valve has a dip tube extending into the vessel.

The dual valve tee design was used in order to introduce He (at a few guage pressure) into the liquid port valve 6 and withdraw resultant He and $BCl_3$ vapor mixture from the vapor port valve 8. In this way He, in effect, bubbled directly through the liquid phase of $BCl_3$ carrying primarily $BCl_3$ vapor into the purification system. When using He in this manner no recondensation of BCl3 was observed inside the processing or analytical systems even though ambient temperature vapor pressure is only 1.3 bar.

High purity He and $N_2$ were used for inert gas purging where needed. The inlet to the exhaust scrubber system was a water venturi drawing a vacuum of about 20 inches Hg (50 cm Hg) (gauge pressure). This vacuum source was also available at various points along the purification train to allow removing of $BCl_3$ vapor from the conduits. As a precautionary measure, the He line had a molecular sieve drier placed upstream to prevent any moisture contamination from the He source. Such moisture would react with $BCl_3$ to form boric acid (a solid) and HCl. The drier turned out to be highly preferred because in one set of tests moisture contamination was present in some of the helium delivery lines. The resultant moisture contamination in this case lead to formation of HCl at high ppm levels; the additional HCl formation was eliminated upon installation of the drier.

After the He/$BCl_3$ vapor mixture left the source container 2, it entered a phosgene decomposition reactor 30, which decomposed the $COCl_2$ impurity. This tubular reactor was arranged vertically in a clam shell furnace with flow entering the bottom of the reactor. The temperature of reactor 30 was controlled at 350° C. by means of an external electrical heater. The reactor 30 contained 8.5 lbs. (about 4.2 kg) of BPL 4×6 granular activated carbon from Calgon. The reactor had dimensions of 4 inches (10 cm) in diameter and 36 inches (about 90 cm) in length. Prior to use, the activated carbon was extensively dried by a heated $N_2$ purge for several weeks.

After passing through the phosgene decomposition reactor 30, the He/$BCl_3$ mixture with some CO and $Cl_2$ passed through some intermediate 0.5 inch (1.27 cm) stainless steel tubing wrapped with thin metal heat transfer fins and a tube-in-tube heat exchanger before entering the chlorine adsorption unit 40. The fins and heat exchanger were needed for two purposes, to reduce the temperature of the He/$BCl_3$/$Cl_2$/CO gas stream exiting reactor 30 so valves in the system were not destroyed by the high heat, and to prevent heating of the chlorine adsorption unit 40, which can lead to reformation of $COCl_2$. The unit 40 was much smaller in size than reactor 30 and was oriented horizontally. It contained approximately 0.2 lbs. (0.1 kg) of the same activated carbon as reactor 30. The unit 40 was used to remove any chlorine generated and then released from reactor 30. In performing $Cl_2$ analysis after the carbon beds 30 and 40, it was observed that initially all the $Cl_2$ was absorbed by reactor 30 alone. Eventually, when reactor 30 became saturated with $Cl_2$, breakthrough occurred. The released $Cl_2$ was then removed by adsorption unit 40.

After passing through adsorption unit 40, the $BCl_3$ was transferred towards two low temperature condensers 50 and 60 maintained at two differing sub-ambient temperatures. Condensers 50 and 60 were equivalent in size to $BCl_3$ source vessel 2. Both condensers had dual valve tees and were plumbed in series, with gas entering the inner tube of the first condenser 50 and exiting to the inner tube of the second condenser 60. The first condenser 50 was contained in a dewar 100 with a glycol solution cooled by a refrigeration unit. The temperature of the cylinder was controlled from −11 to 40° C. During purification runs, the glycol solution was typically at about −5° C. The second condenser 60 was also contained in a dewar 110 which was packed in dry ice (about −78° C.).

FTIR and UV analyzers were installed to allow sampling of gas from many points in the purification system. Sampling of source $BCl_3$ was done by directly connecting $BCl_3$ source container 2 to the FTIR/UV analytical system. Gas flow exited the analytical system directly to the scrubber (not shown).

Design of the scrubber proved to be a fairly daunting task because of the properties of $BCl_3$. Its relatively low vapor pressure at room temperature (about 1.3 bar, or about 130 kPa) causes it to vaporize very slowly. This combined with the fact it forms a solid (boric acid) upon contact with moisture caused a lot of problems with clogging of the scrubber lines. The original scrubber system used for this study was a conventional wet scrubber for acid gases. The input lines had a water venturi system with a flow rate of about 4 gallons/min (about 17.6 liters/min) which recirculated from scrubber to venturi. The venturi created a vacuum of about 20 inches Hg (about 51 cm Hg). This set-up was especially effective for hydroscopic gases like HBr or HCl that readily dissolve in water. $BCl_3$, however, forms solid boric acid on contact with water. This lead to plugging problems and the scrubber design had to be slightly modified.

Modification of the scrubber was made in order to alleviate such problems described above, and is covered by applicant's copending serial number 09/, filed September, 1999, and incorporated by reference herein. In order to allow the $BCl_3$ to dissolve in the water yet avoid contact with moisture vapor in the sampling lines, a two liquid phase system involving a halocarbon oil and sodium hydroxide solution was used. The halocarbon oil, having a density greater than water, settles on the bottom of the scrubber container. The gas stream to be treated is then directed to the bottom of the oil layer after which it bubbles up to an aqueous sodium hydroxide layer and reacts. The aqueous sodium hydroxide layer is typically a 3–6% by weight solution of NaOH. In one case experiment, this halocarbon-aqueous scrubber was placed just prior to the venturi inlet of the conventional acid scrubber unit. The vacuum created by the venturi was reduced in order to prevent any rapid evaporation of the NaOH solution from the two-phase unit. The use of the halocarbon-aqueous scrubber greatly reduced plugging of the conventional acid scrubber system.

All of the conduits used in the purification system were made of 0.25 inch (0.635 cm) and 0.5 inch (1.27 cm) diameter 316L SS electropolished tubing while some of the FTIR sampling lines were 0.125 inch (0.317 cm) 316L SS. Actual flow rates were determined by tracking weight loss of the source container 2 and the weight increase of the collection cylinders (not shown) over time.

Analysis and Calibrations

The FTIR used was a Midac FTIR configured to operate at $2cm^{-1}$ resolution with a MCT detector. It had an Axiom folded path gas cell with an effective path length of 4 meters. Prior to this study, calibration of the FTIR was done for $COCl_2$, HCl, and CO.

TABLE 1

Calibration of the FTIR using various gas standards

| Impurity | Cell Pressure (psig) | Peak Location (cm-1) | Peak Height (Abs units) | Concentration (ppm) | Detection Limit (ppm) |
|---|---|---|---|---|---|
| $COCl_2$ (bal $N_2$) | Near ambient pressure | 851 | 0.422 | 23 | ~0.1 |
| HCl (bal $N_2$) | 5 | 3014, 2998 | 0.038, 0.051 | 50 | ~0.5 |
| CO (bal $N_2$) | 5 | 2172 | 0.044 | 50 | ~0.5 |

For HCl, the peaks analyzed were at 2998 $cm^{-1}$ and 3014 $cm^{-1}$. These peaks were chosen since they did not interfere with the large $BCl_3$ peaks located within the HCl band. The estimated noise level provided detection limits of approximately 0.5 ppm under these experimental conditions.

For CO analysis, the peak at 2172 $cm^{-1}$ was chosen. There is an interference with $BCl_3$ throughout the entire CO band. However, this was not a problem for the analysis of CO since the line width of the $BCl_3$ peak is much broader than the line width of the CO peaks. A simple sparging with He effectively reduced the CO below the detection limit of 0.5 ppm under these experimental conditions.

For $Cl_2$ analysis, a UV/VIS spectrometer (Ocean Optics) with a fiber-coupled one-meter gas cell was utilized. The purpose of this analysis was to make sure no $Cl_2$ from $COCl_2$ pyrolysis remained in the purified product. Calibration of this instrument was performed using $Cl_2/N_2$ mixtures. No $Cl_2$ was seen in the purified product during these initial purification runs even though $Cl_2$ was formed from the phosgene decomposition. This is believed to be due to the high adsorption efficiency of the carbon used in the set up.

During analysis with FTIR or UV/VIS, the concentration of $BCl_3$ in the He/$BCl_3$ mixture varied from day to day somewhat due to resulting temperature of source $BCl_3$. This was due to variations of both ambient temperature (changing the vapor pressure of $BCl_3$) and the flow rate of helium (helium flow rate is not controlled only helium pressure). In order to determine the $BCl_3$ concentration when helium was present, a weak $BCl_3$ band at 2139 $cm^{-1}$ was measured. By monitoring this peak and comparing to that from 100% $BCl_3$, a determination of the $BCl_3$ concentration was estimated. Typically, $BCl_3$ level was around 60–70%.

Preparation of System

The activated carbon beds were dried down with a $N_2$ purge at the operating temperature of 350° C., and above, for several weeks prior to their first exposure to $BCl_3$. At no time during the pilot scale trials were the carbon beds purged with either helium or nitrogen. $BCl_3$ is left stagnant in the trap between purification runs. This is basically keeping the system free of outside impurities, particularly trace moisture, that will exist in the purge gas at low levels. It also minimized the loss of any $BCl_3$ during purification. After more than six months of operation, the same carbon was still being used in reactor 30 without any noticeable degradation in performance.

Example 2

In this case, the source container was replaced with a larger unit containing approximately 1200 lbs. (600 kg) of $BCl_3$. This container was positioned horizontally offering larger liquid-vapor interface area and in this example the inner tube of the container had a dip tube that allowed He to flow directly through the liquid $BCl_3$ and out a second valve of the vapor phase portion of the container into the purification train. In this modification of the system, the process procedure was the same as in Example 1 except additional helium was injected into the low temperature condensers by feeding He in just after the second (low temperature) carbon bed and thus having it flow through the two condensers and out the scrubber like a normal purification run. This additional injection of helium lowered the CO and HCl impurities down to detection limits of 1 ppm or less.

Subsequent gas chromatography analysis indicated no light impurities were present in the purified $BCl_3$ above a detection limit of 100 ppb from current or previous purification work.

Based on the current limited sampling results available today, the concentration level of metals falls within the range of that measured from a competitive high purity $BCl_3$ supplier even though the inventive system did not have any secondary vaporization process specifically for removing metals. Even so, typically, the level of metals (whether from samples produced by inventive system or the competitive high purity $BCl_3$ sample) fall around a few to tens of ppb level for most elements. Very often the most abundant impurity elements found in $BCl_3$ from either the inventive system or the competitive high purity $BCl_3$ sample are Fe, Ca, and Si. These analysis results are taken with liquid phase sampling followed by residue analysis.

Overall, the $BCl_3$ purification process and system of the present invention was a success and high purity $BCl_3$ required for existing semiconductor manufacturers is obtained from low purity $BCl_3$. The main goal of this invention was to take low purity $BCl_3$ with ~100 ppm of $COCl_2$ and produce pure product meeting today's typical semiconductor specifications.

While reference has been made to specific embodiments, these are only meant to be illustrative and those possessed of ordinary skill in the art may alter such embodiments without departing from the scope of the appended claims.

What is claimed is:

1. A system for producing ultra-high purity $BCl_3$ in condensed phase having less than 10 ppm phosgene from a low purity $BCl_3$ condensed phase having phosgene impurity, the system comprising:

a) means for injecting inert gas through a low purity $BCl_3$ having phosgene impurity to produce a vapor stream comprising $BCl_3$, inert gas, and phosgene;

b) means for decomposing a major portion of the phosgene in the vapor stream comprising $BCl_3$, inert gas, phosgene by heating to a first temperature to form a first intermediate vapor stream comprising $BCl_3$, inert gas, carbon monoxide, chlorine, HCl and less than 10 ppm phosgene;

c) a solid adsorbent means for adsorbing a major portion of the chlorine in the first intermediate vapor stream at a temperature lower than the first temperature, thereby producing a $BCl_3$/inert gas vapor stream comprising less than about 10 ppm phosgene and some HCl;

d) means for routing said $BCl_3$/inert gas vapor stream comprising less than about 10 ppm phosgene and some HCl to a condenser;

e) a first condenser means for condensing at least a portion of $BCl_3$ in the $BCl_3$/inert gas vapor stream to form a first condensed phase comprising $BCl_3$, and HCl and inert gas and a second vapor stream comprising inert gas, $BCl_3$, and light impurities;

f) a second condenser means for condensing said second vapor stream, thus forming a gaseous stream comprising less than about 10 ppm $BCl_3$ and a second condensed phase comprising $BCl_3$ and HCl; and g) a stripper means wherein inert gas is used to strip molecules having specific gravity less than $BCl_3$ from the first condensed phase to produce a third condensed phase comprising less than 50 ppm HCl, and stripped vapor phase.

* * * * *